WAVEFORM MEASURING SYSTEM AND METHOD
Filed May 1, 1968
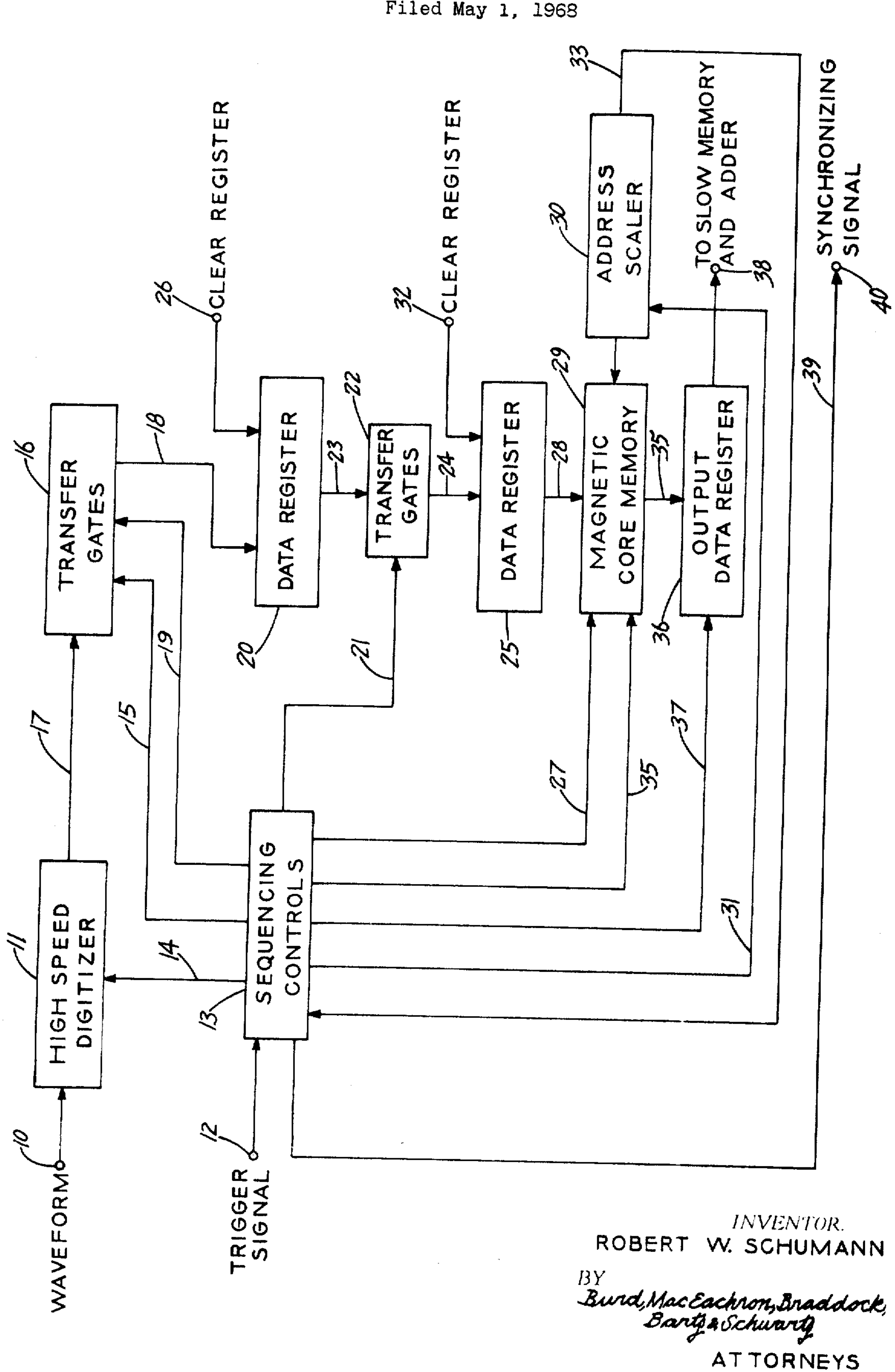
INVENTOR.
ROBERT W. SCHUMANN
BY
Burd, MacEachron, Braddock, Bartz & Schwartz
ATTORNEYS United States Patent Office 3,538,505 Patented Nov. 3, 1970

3,538,505

WAVEFORM MEASURING SYSTEM AND METHOD

Robert W. Schumann, Madison, Wis., assignor to Fabri-Tek Instruments, Inc., Madison, Wis., a corporation of Wisconsin Filed May 1, 1968, Ser. No. 725,876
Int. Cl. G06f 3/05; G11c 9/00
U.S. Cl. 340—172.5 6 Claims

ABSTRACT OF THE DISCLOSURE

A measuring system for analog input waveforms having a digitizer, the output of which is connected to a first data register which can store at least two words from the digitizer. The first data register is connected to a second data register which can also store at least two digitizer output words. The second data register is connected to a memory. When two words from the digitizer have been stored in the first register, they are transferred to the second register and thence to the memory in a single write cycle. Thus, the digitizer output can continue into the first register during the time it takes to transfer two words from the second register into the memory. An output register can be used to take the data from the memory one word at a time into a slow memory and adder such as a signal averager.

BACKGROUND OF THE INVENTION

Digital signal averaging is known in the prior art. This process is used in the measurement of noisy electrical signal waveforms, when it is necessary to average recurrent waveforms by digitizing each recurring signal at a number of time intervals, and then adding the values measured at each interval for one signal to those measured at corresponding intervals for the preceding signals. The result of the addition is a set of numbers representing the total of the voltages measured at the intervals, thus called signal averaging.

One disadvantage of prior art systems is their limitation in speed. The signal averaging process requires digitizing, adding and memory storage operations for each interval. If one were to use the fastest available digitizer, adder and memory known in the state of the art, one would still be limited to approximately two microseconds per interval, whereas those familiar with the art are well aware that a speed twenty times that amount is desirable. The system of this invention overcomes the above mentioned disadvantage, but does so by using a relatively slow adder and memory circuit, and thus does not greatly increase the cost of the system. This is accomplished by having no adding operation and only a half memory cycle in the initial data accumulation, to achieve greater storage speeds. A cost savings is achieved by the using state of the art components in a unique system.

SUMMARY OF THE INVENTION

Briefly described, the system of this invention involves a buffer memory-digitizer to prepare digitized data for a conventional, relatively slow signal averager, or slow memory and adder. The system of this invention utilizes a high speed digitizer which presents its output to buffer storage apparatus, such as a flip-flop register. The register is capable of holding a plurality of output words of the digitizer. A second storage apparatus such as another flip-flop register is also capable of storing a plurality of output words from the digitizer, and receives the words from the first register when it is full. The second register is then used to transfer the words to a memory, such as a magnetic core memory. Thus a great savings in time is achieved during the critical presence of the signal, because the digitizer can continue to feed information into the first register while the memory is being fed by the second register. Only one memory write operation is needed for each plurality of words stored in the registers.

BRIEF DESCRIPTION OF THE DRAWING

The single figure of the drawing represents a block diagram of the system of this invention.

DESCRIPTION OF THE PREFERRED EMBODIMENT

A review of the single figure of the drawing will make apparent that this novel system utilizes components all of which are known to those skilled in the art. For example, there are many high speed digitizers which can serve in the system of this invention, and which are commercially available. Further, storage apparatus such as flip-flop buffer registers are well known in the art, as is a memory such as a magnetic core memory. The control apparatus can be timed by a flip-flop counter or any other properly designed apparatus for operating as a sequence control. Such control apparatus and the logic gates in the system of this invention are well within the design capability of one generally familiar with the art. It is therefore to be noted that it is the interconnection of the components into a novel system, and the method of taking data, which constitutes this invention.

Referring now to the single figure of the drawing, there is seen an input terminal 10 adapted to receive electrical waveforms for presentation to a digitizer such as digitizer 11. As is known in the art, a digitizer such as 11 will operate on recurring waveforms by dividing each waveform into a plurality of time intervals and presenting an N-bit word representing the signal amplitude during the time interval. There is one word of N-bits per data point, that is, per interval.

Concurrent with the appearance of a waveform at terminal 10, trigger signal is applied to another input terminal 12. One common means to provide the trigger signal is to use the leading edge of the waveform at terminal 10. The presence of a trigger signal at terminal 12 will commence operation of the control apparatus, here shown as sequencing controls 13. Sequencing controls 13 can comprise a binary counter, or other apparatus capable of providing timed output signals.

Once actuated by a trigger signal, sequencing controls 13 will provide a sample signal through a line 14 to digitizer 11. Digitizer 11 will then commence operating on the waveform at terminal 10. The next signal from sequencing controls 13 will appear on a line 15 to enable a portion of a plurality of transfer gates 16. Thus, one word of N-bits will be transferred from digitizer 11 through a plurality of lines 17, a portion of transfer gates 16, and through a plurality of lines 18 to a portion of a storage apparatus, here shown as a first data register 20. Data register 20 is capable of storing a plurality of words of N-bits. For the purposes of this explanation, register 20 will be assumed to be a two-word register. It will also be apparent that the single lines of the drawings shown as 17 and 18 are actually a plurality of lines for transfer of N-bits per word.

The next signal from sequencing controls 13 will appear on a line 19 to enable the second portion of transfer gates 16 and allow a second word to be transferred from digitizer 11 through lines 17, gates 16 and lines 18 into register 20. Once two words have been stored in register 20, sequencing controls 13 will provide a signal on a line 21 to enable a plurality of transfer gates 22. The two words stored in register 20 will then pass through transfer gates 22 by means of other lines 23 and 24, and into a second storage apparatus, shown as a second data register 25. Register 25 is capable of storing as many words as register 20. When the transfer of the words from register 20 to register 25 has been completed, a "clear register" signal will be presented at a terminal 26 (for example, from the sequencing controls 13) so that register 20 is prepared to receive further data from digitizer 11.

Also, sequencing controls 13 will through a line 27, present a write signal to a memory, here shown as a manetic core memory 29. Memory 29 will then store the words in register 25, which are presented to memory 29 through a set of lines 28. Sequencing controls 13 will advance an address scaler 30 by means of a signal through a line 31. When memory 29 is full, after a plurality of the above sequences, address scaler 30 will provide an overflow signal on a line 33 to end the sequence and reset sequencing controls 13.

During the time the words in register 25 are being stored in memory 29, digitizer 11 is free to continue its sampling and presentation of data words to data register 20. Thus, digitizer 11 may continue to present useful information during the critical time that waveforms are present at input terminal 10, for the period of time it takes for the words in data register 25 to be read into memory 29. When register 25 has been completely read into memory 29, a "clear register" signal is presented at an input terminal 32 (for example, from sequencing controls 13) to prepare register 25 to receive the next plurality of words from register 20.

The sequence of storing words first in register 20, then transferring them to register 25 for storage in memory 29, is repeated as stated above, until memory 29 has been filled, that is, until address scaler 30 overflows and presents an end sequence signal to sequencing controls 13.

After the above sequence for measuring or sampling a waveform is finished, information may be taken from memory 29 for presentation to a slow memory and adder such as a signal averager (not shown). This can be accomplished by sequencing controls 13 providing a read signal on a line 35 to memory 29. Memory 29 may then reassemble this information into N-bit words which are presented through a set of lines 35 to an output data register 36, which can be a flip-flop register. Shift control of register 36 can be accomplished by sequencing controls 13 providing a signal on a line 37. On receipt of the shift control signal register 36 will present its stored N-bit word to an output terminal 38, adapted to be connected to a slow memory and adder such as a signal averager. Sequencing controls 13 can provide, on a line 39, a synchronizing signal to an output terminal 40, also adapted to be connected to the signal averager.

A review of the above description of the operation of the apparatus of this invention makes apparent the unique method by which high speed samplings can be taken of a noisy waveform, without the need for a costly high speed memory and adder, or signal averager. The method comprises the steps of digitizing the waveform in a known fashion, then storing a plurality of output words of the digitizer in a first buffer register. When a plurality of words have been stored in the first buffer register, they are then transferred to a second buffer register from which they will be read, in a single write cycle, into a memory. On transfer of its information, the first buffer register is immediately available to accept more data from the digitizer, and thus the digitizer may continue to operate at high speeds during the critical time the waveform is present for sampling.

The above description is that of the preferred embodiment of this invention, and that other embodiments may be used without departing from the spirit of the invention. Further, other variations in the system described may be used, such as the connection of a digital to analog converter to the output of the above described system so that the output data are converted to analog form for presentation to a conventional signal averager. As a further example of a variation of this invention, the output could consist of serial pulses, the number of which equals the numerical value of the data points stored at high speed. Each data point can be read out at a more moderate rate into a data register, which is binary or decimal scaler connected, of a slower memory such as the memory of a pulse height analyzer or signal averager. As in the case of the last described variation of the system comprising an analog readout, the object is to provide data in a form which is acceptable to existing instruments and possible future instruments which are not capable of parallel addition processing.

The embodiments of the invention in which an exclusive property or privilege is claimed are defined as follows:

I claim:

1. A data handling system comprising: digitizer means for providing N-bit digital word outputs from an analog waveform input; first digital register means for storing a plurality of N-bit digital words; means connecting said digitizer means to said first digital register means for selective transfer of data therebetween; second digital register means for storing a plurality of N-bit digital words; means connecting said first digital register means to said second digital register means for selective transfer of data therebetween; memory means; means connecting said second digital register means to said memory means for transfer of data therebetween; and control means for preventing transfer of data between said digitizer means and said first digital register means when data is being transferred from said first digital register means to said second digital register means; said control means connected to all said means.

2. The system of claim 1 in which said control means comprises: triggerable sequencing means; and means for providing a trigger to said sequencing means from the analog waveform input.

3. The system of claim 2 including: address scaler means connected to said memory means and said sequencing means, said address scaler means providing an "end sequence" signal to said sequencing means.

4. A system for increasing the speed of measurement of analog waveforms using a high speed digitizer and a slower digital memory and adder comprising: first and second buffer registers each capable of storing at least twice the word length output of the digitizer; first controllable gate means connected between the digitizer and said first register; second controllable gate means connected between said first and second buffer registers; memory means connected to said second register; and control means for controlling the digitizer, said first and second gate means, and said memory means.

5. The method for increasing the speed of measuring electrical waveforms comprising the steps of: providing the waveforms to a digitizer which presents an N-bit word output for each data point; storing, sequentially, a plurality of words from the digitizer into a first register; transferring the plurality of stored words to a second register; and simultaneously performing the steps of, storing additional words in the first register and transferring words stored in the second register to a digital memory.

6. The method of claim 5 including the steps of: transferring data from the memory to an output register; and transferring the data from the output register to a signal averager at a reduced speed.

References Cited

UNITED STATES PATENTS

| | | | |
|---|---|---|---|
| 3,436,733 | 4/1969 | Pearce et al. | 340—172.5 |
| 3,374,467 | 3/1968 | Cast et al. | 340—172.5 |
| 3,362,014 | 1/1968 | Hauck | 340—172.5 |
| 3,312,950 | 4/1967 | Hillman et al. | 340—172.5 |
| 3,241,125 | 3/1966 | Tomasulo et al. | 340—172.5 |

GARETH D. SHAW, Primary Examiner